(12) United States Patent
Yen et al.

(10) Patent No.: US 12,056,754 B2
(45) Date of Patent: Aug. 6, 2024

(54) MULTI-USER SUPPORT AND MULTI-NODE COORDINATION FOR AUTOMATED RETAIL APPARATUSES, ONE OR MORE NON-TRANSITORY COMPUTER-READABLE MEDIA, AND SYSTEMS

(71) Applicant: T-Mobile USA, Inc., Bellevue, WA (US)

(72) Inventors: Leon Chung-Dai Yen, Issaquah, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/198,175

(22) Filed: Mar. 10, 2021

(65) Prior Publication Data
US 2022/0292577 A1   Sep. 15, 2022

(51) Int. Cl.
*G06Q 30/00*      (2023.01)
*G06Q 30/0601*    (2023.01)

(52) U.S. Cl.
CPC ................ *G06Q 30/0635* (2013.01)

(58) Field of Classification Search
CPC .................................. G06Q 30/0635
USPC ....................................... 705/26.81
See application file for complete search history.

(56) References Cited

U.S. PATENT DOCUMENTS

| | | | |
|---|---|---|---|
| 6,772,048 B1 | 8/2004 | Leibu et al. | |
| 8,774,963 B2 | 7/2014 | Signorelli et al. | |
| 9,898,884 B1* | 2/2018 | Arora | G06Q 30/0226 |
| 10,304,057 B1 | 5/2019 | Powell et al. | |
| 10,652,792 B2 | 5/2020 | Yen et al. | |
| 10,671,986 B2 | 6/2020 | Yen et al. | |
| 2005/0080510 A1* | 4/2005 | Bates | G06Q 30/0633 700/241 |
| 2007/0276537 A1* | 11/2007 | Walker | G07F 17/3253 700/238 |
| 2008/0033595 A1 | 2/2008 | Packes et al. | |
| 2010/0138037 A1* | 6/2010 | Adelberg | G07F 9/001 700/241 |
| 2010/0268792 A1 | 10/2010 | Butler et al. | |
| 2017/0090479 A1* | 3/2017 | Wilcox | G05D 1/0274 |

(Continued)

OTHER PUBLICATIONS

Kasavana, M. (2012). 'V-engineering' part 3: How technology will impact and alter consumer purchasing in the future. VendingMarketWatch.Com, Retrieved from https://www.proquest.com/trade-journals/v-engineering-part-3-how-technology-will-impact/docview/1422044972/se-2 (Year: 2012).*

(Continued)

*Primary Examiner* — Arielle E Weiner

(57) ABSTRACT

An autonomous retail system (ARS) can provide a convenient way for a manufacturer or vendor to sell products or services, and an equally convenient way for a customer to find and purchase the same. Users of an ARS may make concurrent orders via a user device for concurrent transaction processing by the ARS. An ARS may determine whether another ARS may be better suited to transact an order if the other ARS has fewer users waiting to place orders. In some embodiments, a map to the better-suited ARS may be presented by the ARS or provided for the user device to present. The map may include an indication of the better-suited ARS(es) and paths to them.

11 Claims, 10 Drawing Sheets

(56) References Cited

U.S. PATENT DOCUMENTS

| | | | |
|---|---|---|---|
| 2017/0092034 A1* | 3/2017 | Want | G06Q 20/18 |
| 2018/0218561 A1* | 8/2018 | Oldroyd | G07F 9/001 |
| 2019/0197544 A1* | 6/2019 | Frost | G07F 9/023 |
| 2019/0244465 A1* | 8/2019 | Saunders | G06Q 20/18 |
| 2019/0295058 A1* | 9/2019 | Shinohara | G06Q 30/0641 |
| 2020/0184531 A1 | 6/2020 | Yen et al. | |

OTHER PUBLICATIONS

Mark Lee "Phone Trouble? Visit Singapore's first 24hr unmanned store." Jun. 4, 2019 (Retrieved Jan. 12, 2021), 13 pages, https://www.singtel.com/personal/articles/phone-trouble-visit-singapores-first-24hr-unmanned-store, Singtel (CRN: 199201624D) All Rights Reserved.

\* cited by examiner

MULTI-USER SUPPORT AND MULTI-NODE COORDINATION FOR AUTOMATED RETAIL APPARATUSES, ONE OR MORE NON-TRANSITORY COMPUTER-READABLE MEDIA, AND SYSTEMS

BACKGROUND

An Autonomous Retail System (ARS) represents a convenient way to obtain a variety of goods and services. Examples of ARSes include vending machines, automatic teller machines (ATMs), online-to-offline lockers, ticket dispensers, and laundry machines. Regardless of the good or service offered, a common characteristic of an ARS, and especially for a popular one, is the unfortunate need to stand in line from time-to-time in order to place an order via the ARS's user interface, obtain access to the ARS to deposit or retrieve an item, etc. In some cases, the user interface may be the way that a customer, or user, enters the order and makes payment. In other cases, the user interface may be the way that a user reserves a space such as a locker and/or obtains access to such a space. Standing in line, entering an order and making payment at the ARS, awaiting the ordered item, and retrieving the same; or waiting to obtain a space such as a locker in which to store an item, or to retrieve an item from the space; all take time and in the aggregate, may consume a not insignificant amount of time for a person on the go

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
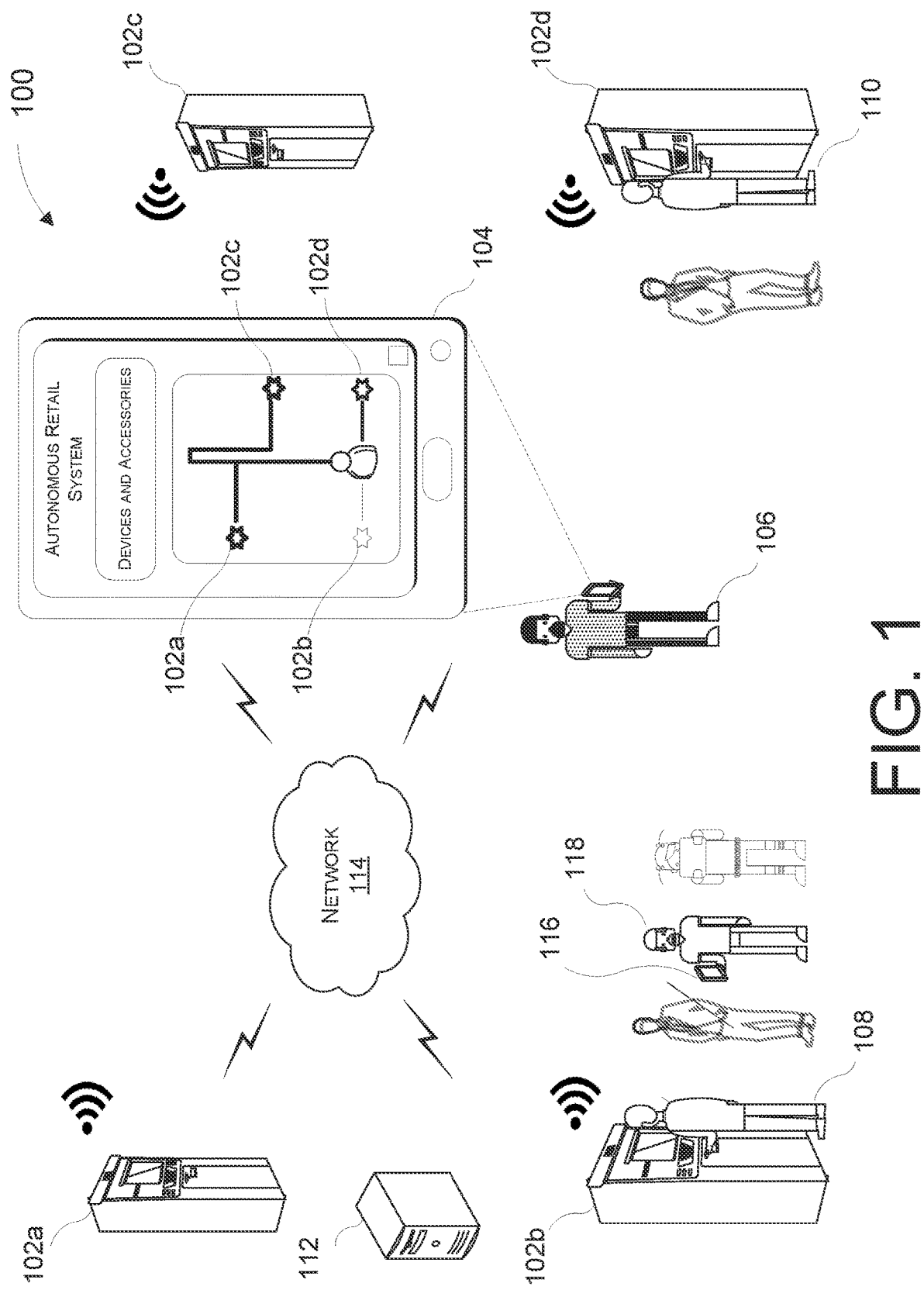
FIG. 1 illustrates an example architecture for multi-user support and multi-node coordination for ARSes utilized by one or more users.

An autonomous retail system (ARS) can provide a convenient way for a manufacturer or vendor to sell products or services, and an equally convenient way for a customer to find and purchase the same. In particular, ARSes, which may include but are limited to vending machines, automated teller machines (ATMs), connected lockers, access controllers, and/or the like, are commonly sized and configured to be easily moved and positioned at a variety of locations which would be unsuitable for a bricks-and-mortar retail establishment. Example locations may include breakrooms, sidewalks, hallways, entertainment establishments, etc.

Certain ARSes, also offer an effective way to make products available in small quantities. For example, products such as devices and accessories provided via the ARSes can be replaced or rotated in or out as demand requires. Similarly, money stored in an ATM can be limited to an amount that satisfies demand but reduces the risk to personnel charged with maintaining the operability and stock in the machine.

Potential customers of popular ARSes (i.e., ones that sometimes attract a number of prospective users at the same time) can suffer from delays caused by lines of people waiting to use the ARS. For example, some workplaces provide ARSes in breakrooms. However, if the employee-breakroom ratio is large, and the vending machine offers popular items, then there may be a high probability that lines will form, which may result in reduced productivity of those employees who choose to wait their turn in line or dissatisfaction among those who do not. Further, a busy ARS may run out of product frequently, necessitating numerous visits to restock the same. Downtime during restocking has its own costs as no employees are able to make purchases while the machine is being reloaded. In other examples, connected ARSes, such as connected lockers, may be provided for users such as employees, club members, or the like to store items for later retrieval, to obtain distributed items waiting for pickup, or to arrange for online-to-offline order and pickup. A busy or inconvenient locker may discourage users from utilizing connected lockers, which could cost the provider in the form of lost sales, reduced productivity, and/or the like.

Transaction flow may be improved by making the order, transaction completion, and fulfillment more efficient. In some examples, a user may use a mobile device to connect to an ARS. Once the user attempts to connect with the ARS, the ARS may create a new virtual instance, replicating the user "standing" before the ARS. In this example, the user can place an order via the mobile device, which order is recognized by the ARS and confirmed via a return communication. Confirming the order, the user may complete the transaction by entering into her device a form of payment or by permitting retrieval of funds from a pre-authorized account, for example. Concurrently, the ARS may create a virtual instance for a second user wishing to make a purchase of his own in a similar manner. The ARS is equipped to handle both transactions with both communication channels open at the same time. In some embodiments, the completed transactions are fulfilled by and/or at the ARS in accordance with respective indicators assigned to the purchasing users. Without delay due to standing in line to place the order and complete the transaction, both users can efficiently obtain their purchase with the only delay being the time from completion of the transaction until their respective indicators are output by the ARS. Orders need not be filled in the order presented but may instead be filled in the manner most efficient to the scenario. As a result, inconvenience to the users may be minimized.

In other examples, transaction flow may be improved by distributing users among a plurality of ARSes. In some scenarios, this may entail giving users information that informs them of other ARSes providing similar products or services that are under less load, for example by having fewer people waiting in line or by transactions being conducted more quickly. On making a connection (e.g., a virtual instance as described above), the ARS may indicate to the user the presence (or absence) of other ARSes offering the same product or service. Adding ARSes to spread out the customer demand may alleviate some of the inconvenience. Such load balancing may entail directing customers to ARSes that are currently experiencing lower demand compared to others. The indication may take the form of a notice of other ARSes by number, location, and/or relative rank for estimated time-to-fulfillment, for example. In some embodiments, the indication may also include a map to the provided ARSes. The user may then opt to wait for the current ARS or proceed to one of the other recommended ARSes.

In some embodiments, the ARS provides the information about other ARSes in response to the user's order. In such embodiments, having the order information, the original ARS may offer to transfer the order to a user-selected ARS and/or complete the transaction itself, followed by passing the completed transaction information to the selected ARS such that the user need merely approach the selected ARS and retrieve the purchased good as the ARS provides the same.

In other scenarios, an ARS may provide a service such as access control to an event. For example, as ARS that sells tickets may suffer from the inconveniences described above. A ticketless system may be little different as lines may form to obtain access validation via the ARS. In such scenarios, the ARS may be able to direct the user to other access points in a fashion similar to that described with respect to the user's being directed to other ARSes to obtain a transacted product.

FIG. 1 illustrates an example architecture 100 for multi-user support and multi-node coordination for ARSes utilized by one or more users. The example architecture 100 may include one or more ARSes 102 (here, four are shown for purposes of illustration, ARS 102a, ARS 102b, ARS 102c, and ARS 102d). The ARSes 102a-102d may communicate wirelessly with each other and/or with one or more user devices such as a user device 104 held by a user 106 as shown. Other users illustrated in FIG. 1 include a user 108 at ARS 102b and a user 110 at ARS 102d. In some embodiments, one or more of the ARSes 102a-102d and the user device 104 may communicate with a server 112.

The ARSes 102a-102d may be vending machines, ATMs, connected lockers, access controllers, and/or similar apparatus that comprise components and/or perform operations as described herein for enabling multi-user support and/or multi-node coordination. For example, the ARSes 102a-102d may be vending machines that dispense merchandise to users in accordance with one or more embodiments described herein. In other examples, the ARSes 102a-102d may be ATMs that dispense cash and/or facilitate financial operations, or may be access controllers that control access to an event such as a sporting event, concert, or movie. In yet further examples, the ARSes 102a-102d may be connected lockers. Although four ARSes are shown in FIG. 1, this number is not limitative.

The user device 104 may be a mobile device such as a smartphone, tablet, wearable, or other device, including devices dedicated to interactions with one or more of the ARSes 102a-102d as described herein. In some embodiments, using an application resident on the user device 104, the user 106 may place orders and complete transactions with one or more of the ARSes 102a-102d, as well as retrieve purchased products therefrom.

The server 112 may be configured to communicate wirelessly with one or more of the ARSes 102a-102d and/or with the user device 104 directly or via a network 114. Additionally, or in the alternative, the server 112 may communicate with one or more of the ARSes 102a-102d via a wired connection. In some embodiments, two or more of the ARSes 102a-102d may comprise a network, with or without the server 112. If networked, then the server 112 is configured as a network server. The user device 104 may be part of the network 114, communicate with the server 112 and/or any of the ARSes 102a-102d via the network 114, and/or communicate directly with any of these outside of the network 114.

Figure 2:
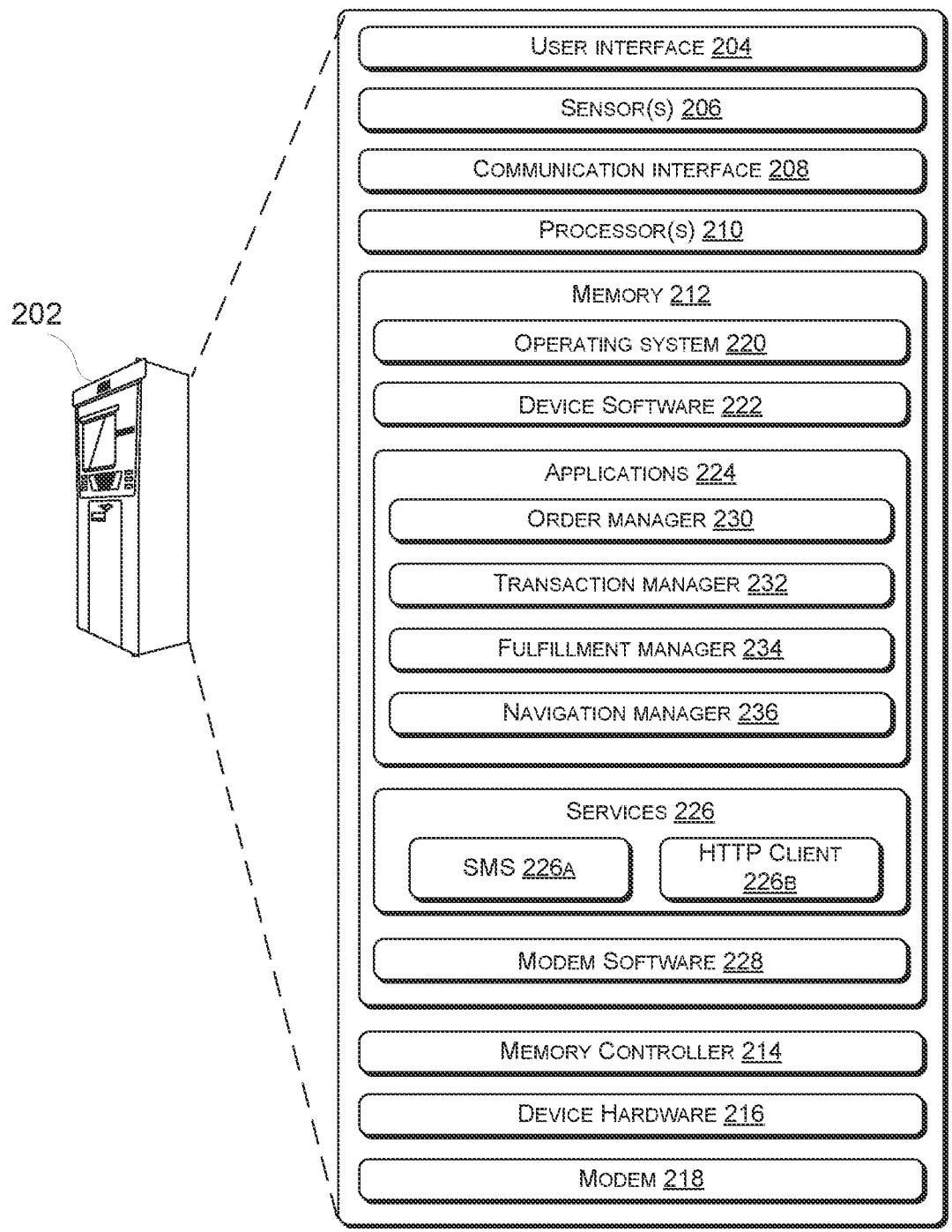
FIG. 2 illustrates various components of an ARS that implements multi-user support and multi-node coordination for ARSes.

FIG. 2 illustrates various components of an ARS 202 that implements multi-user support and multi-node coordination for ARSes. The ARS 202 may represent and correspond to one or more of the ARSes 102a-102d illustrated in FIG. 1. The ARS 202 may be configured with hardware, software, and/or firmware to, among other things, communicate with other ARSes and the user device 104, as well as carrying out various other operations described herein. As shown in FIG. 2, the ARS 202 may include a user interface 204, one or more sensors 206, a communication interface 208, one or more processors 210, memory 212, a memory controller 214, device hardware 216, and a modem 218.

The user interface 204 may enable a user to provide input and receive output from the ARS 202. The user interface 204 may include a data output device (e.g., visual display, audio speakers), and one or more data input devices. The data input devices may include, but are not limited to, combinations of one or more of touch screens, physical buttons, cameras, biometric readers, keypads, keyboards, mouse devices, code scanners, microphones, speech recognition packages, and any other suitable devices or other electronic/software selection methods.

The sensor(s) 206 may be in the form of one or more cameras capable of capturing still images and/or video and/or one or more microphones or transducers to capture audio. Non-multimedia sensors include without limitation proximity sensors (an example of which may detect movement or determine a proximity of the mobile device 104 to the ARS 202), GPS sensors, ambient light sensors, and backlight illuminated sensors.

The communication interface 208 may include wireless and/or wired communication components that enable the ARS 202 to transmit data to and receive data from other networked devices such as other ARSes and the user device 104 via a communication network such as the network 114. In some embodiments, the communication network may be a wired and/or wireless communication network, including but not limited to cellular networks, the Internet, and/or other public and private networks, including LANs, WANs, VPNs, and/or other networks.

The one or more processors 210 may comprise a central processing unit and/or a dedicated controller such as a microcontroller. The one or more processors 210 and the memory 212 may implement device software 222, one or more applications 224, one or more pre-installed services 226, and modem software 228. The various software and applications may include routines, program instructions, objects, and/or data structures that are executed by the processor(s) 210 to perform particular tasks or implement particular abstract data types.

The processor(s) 210 and the memory 212 may implement an operating system 220 stored in the memory 212.

The operating system 220 may include components that enable the ARS 202 to receive and transmit data via various interfaces (e.g., the user interface 204, the communication interface 208, and/or memory input/output devices), as well as process data using the processor(s) 210 to generate output. The operating system 220 may include a presentation component that presents output (e.g., display data on an electronic display, store the data in memory, transmit the data to another electronic device, etc.). Additionally, the operating system 220 may include other components that perform various additional functions generally associated with an operating system.

The memory 212 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The memory controller 214 may include hardware, software, or a combination thereof, that enables the memory 212 to interact with the communication interface 208, processor(s) 210, and other components of the ARS 202. For example, the memory controller 214 may receive data or instructions from the communication interface 208 and store the same in the memory 212. In some embodiments, the memory controller 214 may retrieve instructions from the memory 212 for execution by the processor(s) 210.

The device hardware 216 may include additional hardware that facilitates various device functions performed by the ARS 202. For example, the device hardware 216 may include signal converters, antennas, hardware decoders and encoders, graphic processors, a Universal Integrated Circuit Card (UICC) slot and/or the like that enables the ARS 202 to execute applications and provide telecommunication and data communication functions.

The modem 218 is a hardware component that enables the ARS 202 to perform telecommunication and data communication, e.g., with the network 112.

The device software 222 may include software components that enable the server 202 to perform typical server functions. For example, the device software 232 may include a basic input/output system (BIOS), Boot ROM, or bootloader that boots up the server 202 and executes the operating system 218 following power up of the server.

The applications 224 may include applications that provide utility, entertainment, and/or productivity functionalities to a user of the ARS 202. For example, the applications 224 may include telephony applications, electronic mail applications, remote desktop applications, web browser applications, order management applications, transaction management applications, navigation management applications, multimedia streaming applications, gaming applications, and/or so forth.

The one or more pre-installed services 226 may include, without limitation, SMS service software 226a and an HTTP service client 226b. The SMS service software 226a may provide the mobile device 104 with the ability to send and receive SMS messages from a Short Message Service Center (SMSC)/Short Message Service Function (SMSF), such as an SMS server that resides on the communication network 108. In various embodiments, the transmission of messages between the SMSC/SMSF and the SMS service software 226a may be performed according to the Mobile Application Part (MAP) of the Signaling System 7 (SS7) protocol. The size of the SMS messages may be constrained by the protocol to 140 octets or 1120 bits. The SMS messages may be encoded using a variety of alphabets, such as the GSM 7-bit alphabet, the 8-bit data alphabet, the 16-bit UCS-2 alphabet, and/or so forth. In some embodiments, the SMS messages that are passed between the SMS service software 226a and the SMSC/SMSF may be encrypted and decrypted by both parties according to the SCP80 OTA secure channel protocol, or another equivalent secure SMS communication protocol.

The HTTP service client 226b may enable the ARS 104 to establish a communication session with a server, such as a web server or a file service, using HTTP. The server 112 may be an example of such a server. HTTP is an application layer protocol that uses an underlying transport layer protocol, such as the Transmission Control Protocol (TCP), the User Datagram Protocol (UDP) and/or so forth. HTTP is a request-response protocol, in which the HTTP service client 226b may submit an HTTP request message, and the server may respond with a requested resource in a response message to the HTTP service client. In some embodiments, the HTTP service client may also use the HTTP Secure (HTTPS) protocol to communicate with a server, in which the communication session is encrypted by a security protocol, such as the Secure Socket Layer (SSL) protocol, the Transport Layer Security (TLS) protocol, and/or so forth.

The modem software 228 may drive the modem 218 to perform telecommunication and data communication, e.g., with the network 112. The modem software 228 may be firmware that is stored in dedicated non-volatile memory of the ARS 202. Such non-volatile memory may include read-only memory (ROM), erasable programmable read-only memory (EPROM), or flash memory.

The operating system 218, device software 222, applications 224, pre-installed services 226, and modem software 228 may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The applications 224 may include an order manager 230, a transaction manager 232, a fulfillment manager 234, and a navigation manager 236. In some embodiments, the instructions that compose these managers may, if executed by the processor(s) 210, cause the processor(s) 210 to perform respective operations in accordance with communications held between the user device 104 and one or more of the ARSes 102a-102d.

For instance, the ARS 102b, via the communication interface 208, may open a connection in response to a communication from the user device 104. In some embodiments, the connection may be established before the order. The order manager 230 may receive an order for a product or service from the user device 104 and respond with a confirmation of the order and/or its cost. The response may be configured for the user 106, via the user device 104, to confirm or cancel the order.

If the user device 104 responds with a cancellation, then the order manager 230 may cancel the operation and close the connection. In response to a confirmation received from the user device 104, the transaction manager 232 may initiate operations for completing a transaction between the user device 104 and the ARS 102b. More specifically, the transaction manager 232 may send a response to the user device 104 requesting payment on the order. The payment may take any form that settles the transaction, for example and without limitation an authorization to charge a credit or debit card, withdraw money from a cash account, and/or the like. The response may be configured for the user 106, via the user device 104, to authorize the payment, cancel the payment, or edit the order, for example. If the user device 104 responds with a cancellation, then the transaction manager 232 may cancel the transaction and close the connection. If the user device 104 responds with an edit of the order, then the transaction manager 232 may make the requested edit to the order, and send another response requesting payment on the edited order. In some examples, if the requested edit is improper or cannot be complied with, the transaction manager 232 may respond with an error message or end the transaction.

In response to payment on the order, the fulfillment manager 234 may cause the output of an order number for presentation via the user interface 204. For example, a visual or audible presentation of the order number or other indication may be output. Correspondingly, the fulfillment manager 234 may cause the release of the requested product for the user 106 of the user device 104 to claim. In the case of a purchased service, the order number or other indication may be used to claim the purchased service.

In some implementations, the navigation manager 236 may coordinate with one or more other ARSes, the user device 104, and/or the server 112 to determine whether another ARS may be less busy than the ARS 102b and/or have a product in stock that is not available at the ARS 102b because the ordered item is out of stock or not offered or for another reason. For example, the navigation manager 236 may determine that another ARS may be more suitable for transacting the requested order and inform the user device 104 via one or more of the ARSes 102a-102d and/or the server 112 of such other ARS and direct the user 106 of the user device 104 to the same. Alternatively, or in addition, and in response to the communication, the better suited ARS and/or the server 112 may communicate this information to the user device 104. The determination and communication(s) may be performed at any stage of the transaction with the ARS 102b. In some embodiments, the determination and communication(s) may be made in response to a request from the user device 104 for a better suited ARS, absent a proceeding transaction.

To illustrate, consider the scenario depicted in FIG. 1. In that figure, the user 106 is interested in making a purchase from an ARS such as the ARS 102b. The user 106, as well as the other users in line, may be able to make orders for products or services vended by the ARS 102b if they have devices equipped with the appropriate application 326. Moreover, more than one of these users whose devices are so equipped may be able to place orders simultaneously or concurrently such that one or more of the order manager 230, transaction manager 232, fulfillment manager 234, or navigation manager 236 are processing orders at the same time.

Now consider that, on approaching the ARS 102b, the user 106 observes that there is a line of three people waiting behind the user 108 who is at the ARS 102b. Wishing not to wait in such a line, the user 106 may activate the navigation manager 236 to find another ARS having a similar product for sale (the same procedure might be carried out in the event that the ARS 102b is out of stock for the product or the product is otherwise unavailable from the ARS 102b). In response, the navigation manager 236 may determine that the ARS 102a, ARS 102c, and/or ARS 102d are in the vicinity of (e.g., within range of direct communication with) the user device 104, the ARS 102b, and/or the server 112 such that the ARS 102b (and/or one of the ARSes 102a, 102c, or 102d and/or the server 112) may send to the user device 104 information on the nearby ARSes 102a, 102c, and/or 102d, namely whether one or more have the product available, where they are located, and a path to get there. The information may be communicated directly from the ARS 102b to the user device 104 or indirectly from the ARS 102b to the user device 104 via ARS 102a, 102c, or 102d in response to an instruction from the ARS 102b, or via the server 112 in a network scenario. In such scenarios, the server 112 may be monitoring the stock of one or more of the ARSes 102a-102d such that the server 112 is aware of the availability of these ARSes. Additionally, or alternatively, the information may be communicated to the user device 104 directly from the ARS 102a, 102c, or 102d on detecting the order from the user device 104.

Figure 3:
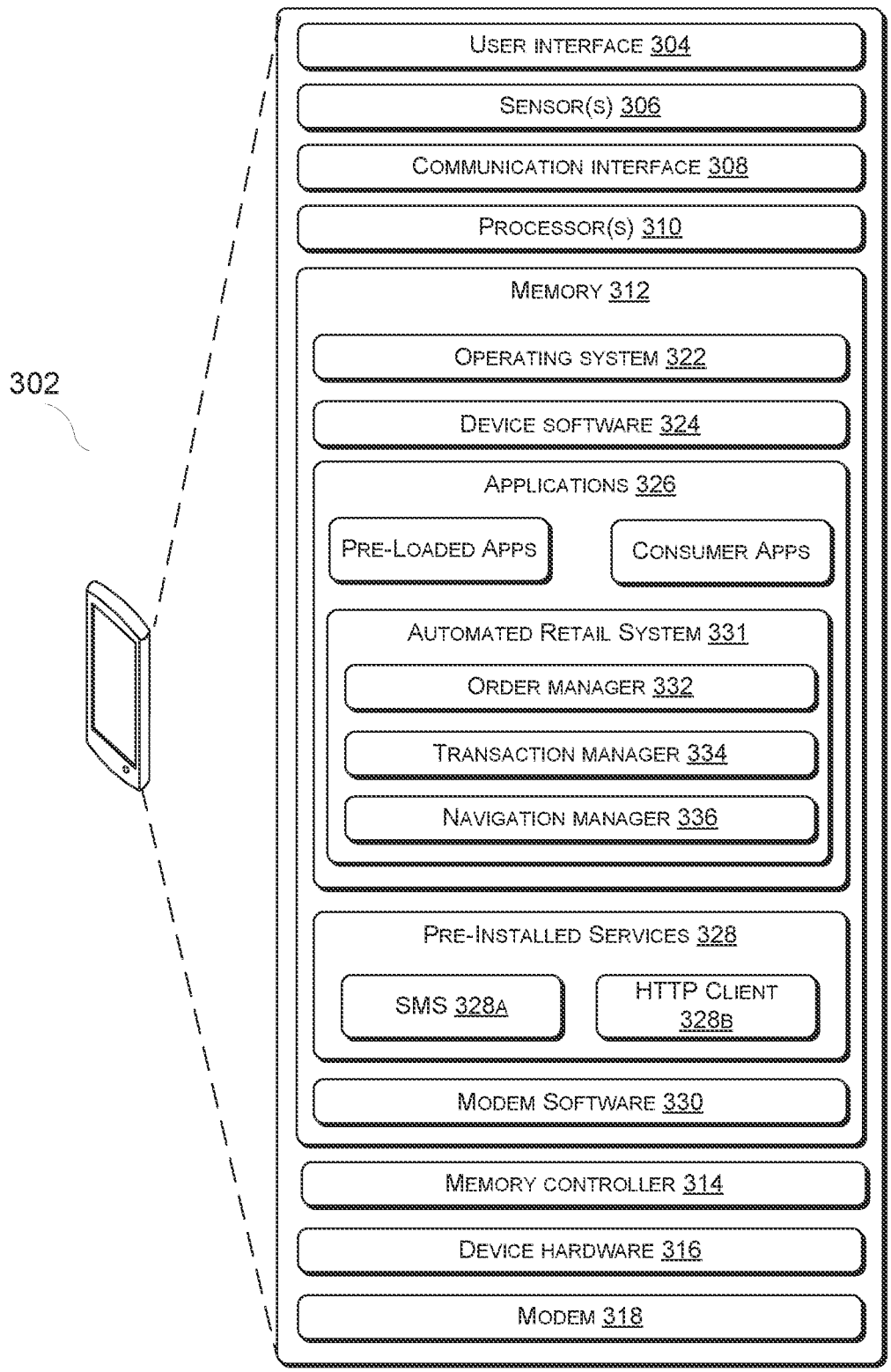
FIG. 3 illustrates various components of an illustrative user device.

FIG. 3 illustrates various components of an illustrative user device 302. The user device 302 may be similar to the user device 104 shown in FIG. 1. The user device 302 may include a user interface 304, one or more sensors 306, a communication interface 308, one or more processors 310, memory 312, a memory controller 314, device hardware 316, and a modem 316. These components may be similar to like-named components of the ARS 202 and support similar functions in the user device 304. Similarly, the memory 312 may store various software that may comprise instructions and function in a manner similar to software stored in the memory 212. For example, and without limitation, the memory 312 may store an operating system 322, device software 324, one or more applications 326, pre-installed services 328 (including SMS software 328a and an HTTP client 328b), and modem software 330. The operating system 322, device software 324, applications 326, pre-installed services 328, and modem software 330 may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The applications 326 may include applications that provide utility, entertainment, and/or productivity functionalities to a user of the user device 302. For example, the applications 326 may include telephony applications, electronic mail applications, remote desktop applications, web browser applications, order management applications, transaction management applications, navigation management applications, office productivity applications, multimedia streaming applications, and/or so forth.

The applications 326 may include an order manager 332, a transaction manager 334, and a navigation manager 336. In some embodiments, the instructions that compose these managers may, if executed by the processor(s) 310, cause the processor(s) 310 to perform respective operations in accordance with communications held between the user device 104 and one or more of the ARSes 102a-102d.

For instance, the ARS 102b may open a connection via the communication interface 208 in response to an order from the order manager 332 of the user device 104 via the communication interface 308. In some embodiments, the connection may be established before the order. The order manager 332 may place the order in response to input by the user 106 via the user interface 304.

In response to communication(s) from the ARS 102b requesting confirmation of the order and/or providing its cost, the transaction manager 334 may send a communication configured to confirm, cancel, or edit the order. The communication may be initiated by the user 106 via the user interface 304. If the transaction manager 334 responds with a cancellation, then the transaction manager 334 may stop internal operations related to the transaction and close the connection. In some embodiments, the transaction manager 334 may initiate operations for completing the transaction.

More specifically, the transaction manager 334 may receive a communication from the ARS 102b requesting payment on the order. The payment may take any form that settles the transaction, for example and without limitation an authorization to charge a credit or debit card, withdraw money from a cash account, and/or the like. If the transaction manager 334 responds with a cancellation, then transaction operations are stopped and the connection is closed. If the transaction manager 334 responds with an edit of the order, then the ARS 102b may make the requested edit to the order and send another response requesting payment on the edited order. If the transaction manager 334 confirms the transaction, then the transaction manager 334 may receive information from the ARS 102b to that effect with an order number which is to be presented when the order is ready.

In some implementations, the navigation manager 336 may coordinate with one or more of the ARSes 102a-102d and/or the server 112 to determine whether another ARS may be less busy than the ARS 102b and/or have a product in stock that is not available at the ARS 102b because the ordered item is out of stock or not offered or for another reason. For example, the navigation manager 336 may request, or receive without a specific request, information that another ARS may be more suitable for transacting the requested order, and from one or more of the ARSes 102a-102d and/or the server 112 receive a direction to such ARS. Alternatively, or in addition, the navigation manager 336 may receive information on the better suited ARS from that ARS itself and/or from the server 112. The determination and communication(s) may be performed at any stage of the transaction with the ARS 102a. In some embodiments, the determination and communication may be received in response to a request from the navigation manager 336 for a better suited ARS, absent a proceeding transaction.

To illustrate, again with reference to the example scenario of FIG. 1, consider that the user 106 is interested in making a purchase from an ARS such as the ARS 102b. The user 106, as well as the other users in line, may be able to make orders for products or services vended by the ARS 102b if they have devices equipped with the appropriate application 324.

Now consider that, on approaching the ARS 102b, the user 106 observes that there is a line of three people waiting behind the user 108 who is at the ARS 102b. Wishing not to wait in such a line, the user 106 may activate the navigation manager 336 to request the ARS 102b to find another ARS having a similar product for sale (the same procedure might be carried out in the event that the ARS 102b is out of stock for the product or the product is otherwise unavailable from the ARS 102b). In response, the ARS 102b may return information that the ARS 102a, ARS 102c, and/or ARS 102d are in the vicinity of (e.g., within range of direct communication with) the user device 104, the ARS 102b, and/or the server 112 such that the ARS 102b (and/or one of the ARSes 102a, 102c, or 102d and/or the server 112), and/or information on the nearby ARSes 102a, 102c, and/or 102d. For example, the information may include whether one or more of the ARSes 102a, 102c, and/or 102d have the product available, where they are located, and a path to get there, which may be presented (e.g., displayed or announced) via the user interface 304 by the navigation manager 336. The information may be received by the user device 104 directly from the ARS 102b or indirectly from the ARS 102b via ARS 102a, 102c, or 102d in response to an instruction from the ARS 102b, or via the server 112 in a network scenario. Additionally, or alternatively, the information may be received by the user device 104 directly from the ARS 102a, 102c, or 102d on detecting the order from the user device 104.

Figure 4:
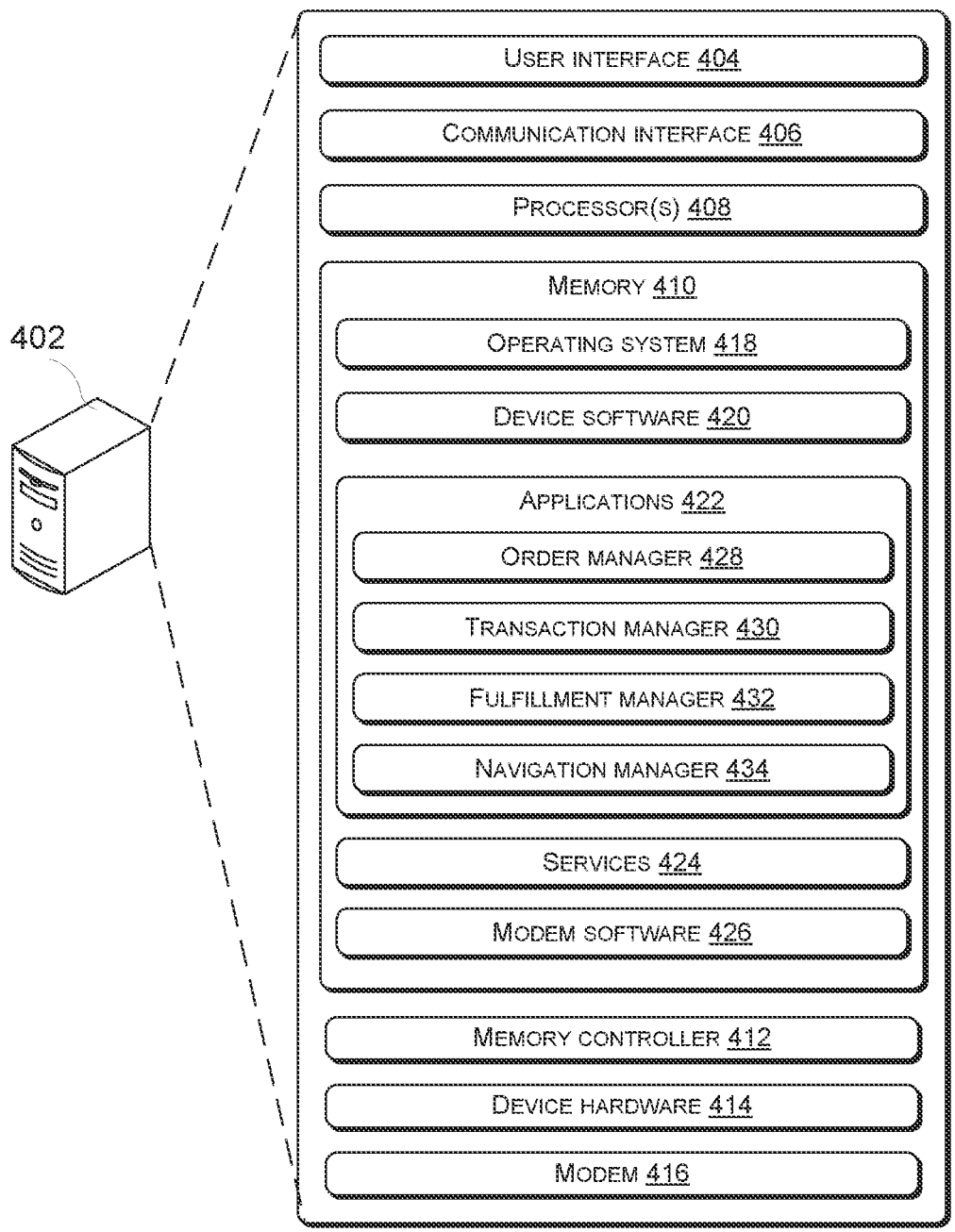
FIG. 4 illustrates an example server that is configured to provide multi-user support and multi-node coordination for ARSes.

FIG. 4 illustrates an example server 402 that is configured to provide multi-user support and multi-node coordination for ARSes. For example, the server 402 may be configured as a host server to provide network services in support of the ARSes 102a-102d. In this capacity, the server 402 may communicate with the ARSes 102a-102d, the user device 104, and/or other computing devices in a wide area network, a local area network, the Internet, a wired connection, a wireless connection, and/or any other type of network or connection suited for the purposes described herein. The wireless connections in some embodiments may include Wi-Fi; short-range radio such as NFC, RFID, Bluetooth or Bluetooth low energy (BLE); infrared; and/or any other wireless connection. The server 402 may be similar to the server 112 of FIG. 1.

A server such as the server 402 may be analogous to the mobile device 104 in many respects. For example, the server 402 may be configured with hardware, software, and/or firmware to, among other things, communicate with the ARSes 102a-102d and the user device 104, as well as carrying out various other operations described herein. As shown in FIG. 4, the server 402 may include a user interface 404, a communication interface 406, one or more processors 408, memory 410, a memory controller 412, device hardware 414, and a modem 416. Some of the components of the server 402 may be implemented in a single computing device or distributed over multiple computing devices. Some may be in the form of virtual machines or software containers that are hosted in a cloud in communication with disaggregated storage devices. It is noted that in some embodiments, some or all of the functions of the server 402 may be assumed by an ARS configured similarly to perform as a network server.

Some or all of the server components may be similar to like-named components of the ARS 202 and support similar functions in the server 402. Similarly, the memory 410 may store various software that may comprise instructions and function in a manner similar to software stored in the memory 212. For example, and without limitation, the memory 410 may store an operating system 418, device software 420, one or more applications 422, various services 424, and modem software 426. The operating system 418, device software 420, applications 422, services 424, and modem software 426 may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The applications 422 may include applications that provide utility and/or productivity functionalities to a user of the server 402. For example, the applications 422 may include telephony applications, electronic mail applications, remote desktop applications, web browser applications, order management applications, transaction management applications, navigation management applications, multimedia streaming applications, gaming applications, and/or so forth.

The applications 422 may include an order manager 428, a transaction manager 430, a fulfillment manager 432, and a navigation manager 434. In some embodiments, the instructions that compose these managers may, if executed by the processor(s) 408, cause the processor(s) 408 to perform respective operations in accordance with communications held between the server 402 and one or more of the user device 104 and/or one or more of the ARSes 102a-102d, much in the same fashion as the order manager 230, the transaction manager 232, the fulfillment manager 234, and the navigation manager 236 function as described elsewhere herein.

For instance, the server 402 may carry out one or more of the functions performed by the ARS 102b in the order, transaction, fulfillment, and navigation support provided the user device 104. Thus, the order manager 428 may receive an order for a product or service from the user device 104 and respond with a confirmation of the order and/or its cost, the transaction manager 430 may complete a transaction between the user device 104 and the ARS 102b including processing payment, the fulfillment manager 432 may cause the output of an order number for presentation via the user interface 204 and the release of the requested product, and the navigation manager 434 may coordinate with one or more of the ARSes 102a-102d and/or the user device 104 to direct the user 106 to a better suited ARS, if desired and available.

Other functions performed by the order manager 230, the transaction manager 232, the fulfillment manager 234, and the navigation manager 236 may be performed by their corresponding managers in the server 402 as well. Thus, reference to the example scenario described above with respect to FIG. 1 applies to the server 402 acting in support of the ARS 102b (as well as ARSes 102a, 102c, and 102d and the user device 104).

Figure 5:
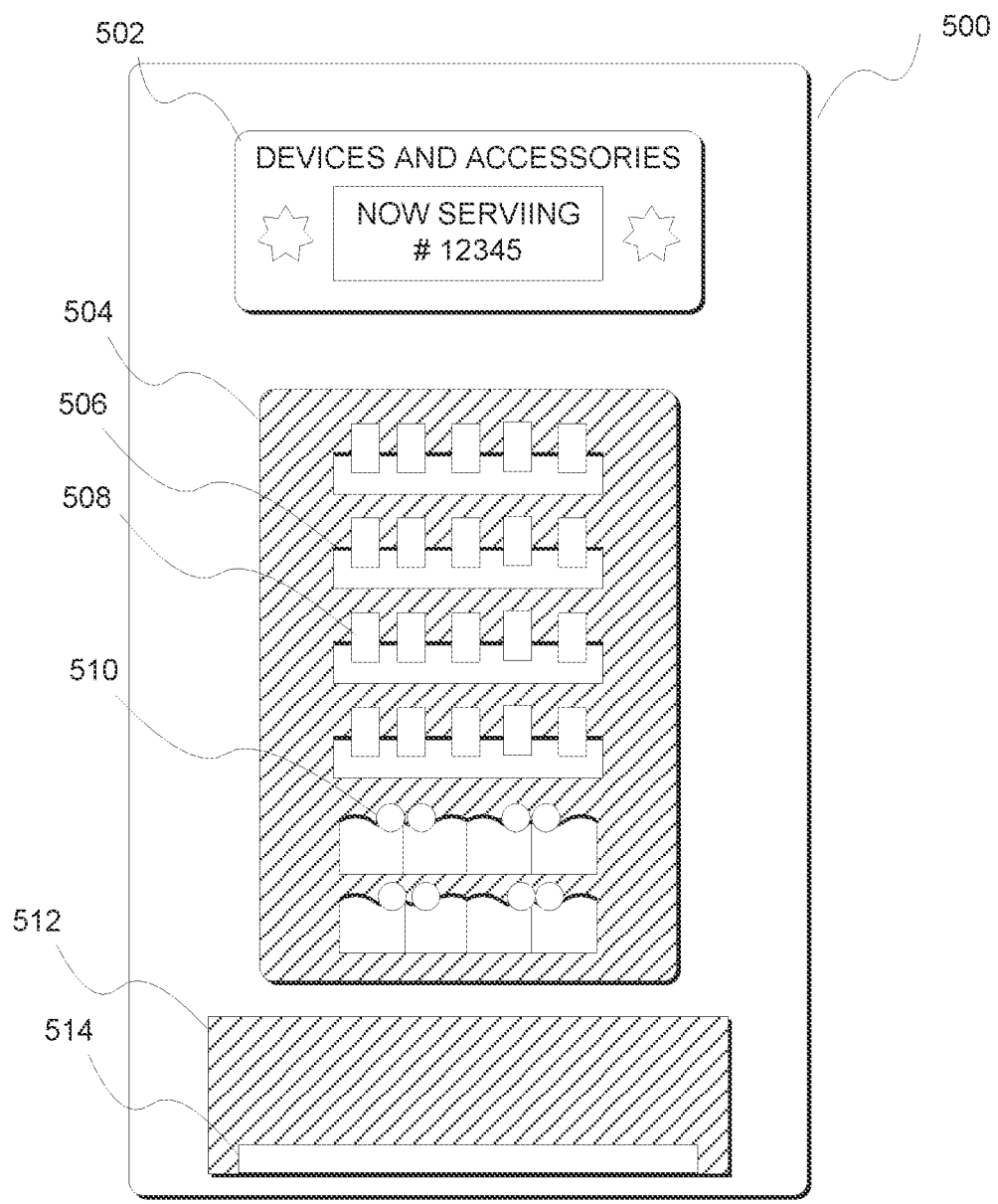
FIG. 5 illustrates an example of an ARS functioning as a device and accessory vending machine.

FIG. 5 illustrates an example of an ARS 500 functioning as devices and accessories vending machine. The ARS 500 may correspond to any of the ARSes 102a-102d described herein. In some embodiments, the ARS 500 may include a display 502, a compartment 504, one or more product holders 506 for holding, e.g., devices 508 and accessories 510, and a dispensing station 512 having an opener 514 by which products released from their product holders 506 may be retrieved by the user 106. Although devices 508 and accessories 510 are described and shown, it should be noted that other products such as food, drinks, apparel, vouchers for non-displayed products, and/or vouchers for services may also be offered via the ARS 500. In some embodiments, the ARS 500 may be an ATM, such that indicators of paper or coin currency may be shown rather than showing visible holders for supporting them.

The display 502 may include a visual and/or audible presentation that indicates the order number (or other indicator) that the user 106's order is ready for retrieval. In some embodiments, the ARS 500 may process multiple orders concurrently. Presenting the order in the manner shown, or in a similar manner, permits multiple users to place their orders and complete payment without waiting in line for their turn to order. When the order number appears, the product is ready for retrieval. Additionally, or alternatively, the indication that the order is ready to be retrieved may be provided to the user device 104.

The compartment 504 may house the products for sale. In the example shown, devices 508 (e.g., phones, tablets, wearables, and/or the like) and accessories (e.g., batteries, cases, chargers, headsets, SIM cards, memory cards, and/or the like) 510 are shown, although no limitation is intended or should be inferred. In fulfilling a completed order, a mechanism (not shown) in the ARS 500 is configured to release the purchased items by releasing them from their product holders 506.

The dispensing station 512 represents the location where released products are provided for retrieval by the user 106. In the example shown, the dispensing station is a cavity or compartment and a handle is provided as the opener 514 by which the cavity or compartment may be accessed for product retrieval. However, any number or type of dispensing station and/or opener may be employed.

Figure 6:
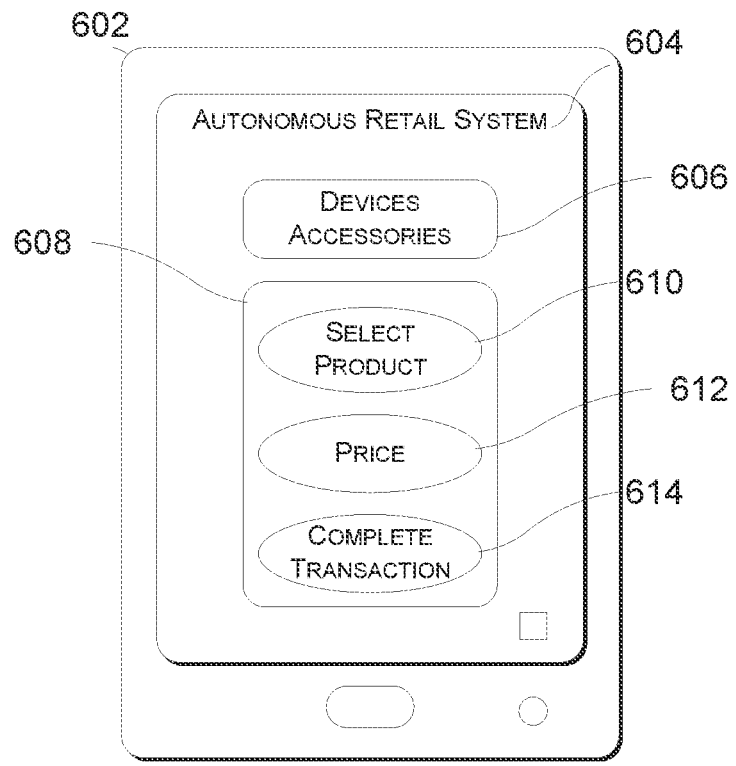
FIG. 6 illustrates a user device configured to communicate with one or more ARSes in a multi-user support and multi-node coordination architecture as described herein.

FIG. 6 illustrates a user device 602 configured to communicate with one or more ARSes 500 (e.g., one or more of the ARSes 102a-102d) in a multi-user support and multi-node coordination architecture as described herein. The user device 602 may be similar to the user device 104 and/or user device 302.

As illustrated in FIG. 6, the user device 602 may have a user interface 604 that provides access to the application, "Autonomous Retail System" 331. Displayed within the user interface 604 is the name of the application, a designator 606 of products offered for sale via the ARS 500, and a selection section 608 where the user 106 may select a product using selection button 610, verify the price using selection button 612, and complete the transaction using selection button 614. In some embodiments, the selection button 610 is activated for user selection by the order manager 332 to place the order; the selection button 612 is activated for user selection by the transaction manager 334 to confirm the price, and the selection button 614 is activated for user selection by the transaction manager 334 to indicate to the ARS 500 to complete the transaction.

Figure 7:
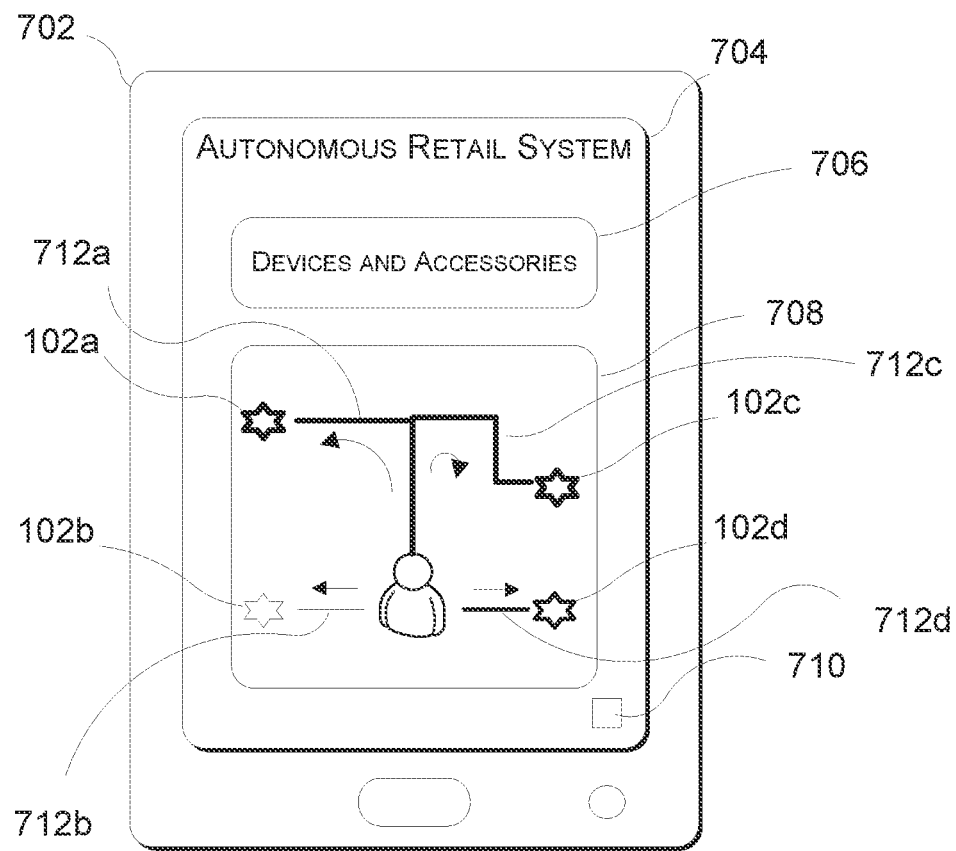
FIG. 7 illustrates a user device configured to communicate with the ARS in a multi-user support and multi-node coordination architecture as described herein.

FIG. 7 illustrates a user device 702 configured to communicate with the ARS 102b in a multi-user support and multi-node coordination architecture as described herein. The user device 702 may be similar to the user device 104 and/or user device 302.

As illustrated in FIG. 7, the user device 702 may have a user interface 704 that provides access to the application, "Autonomous Retail System" 331. A presentation 706 of the items for purchase in the ARS 102b is shown—devices and accessories are for sale. A map 708 of the vicinity of the ARS 102b is also shown via the user interface 704, along with a button 710 that may be used to toggle between the map display of FIG. 7 and the concurrent multi-user display of FIG. 6, and/or to move within one of these views or to another view of the application. The map 708 of ARSes in the vicinity of the ARS 102b may show ARSes 102a-102d and respective paths 712a-712d corresponding to the same.

FIG. 7 may correspond to one or more embodiments in which the user 106 uses the user device 702 to order a product (a service could be ordered in some embodiments) from the ARS 102b but the ARS 102b is able to ascertain, via the Autonomous Retail System application 331 or another one of the applications 326, that another ARS, such as ARS 610b, 610c, or 610d in the illustrated example, may be suggested to the user 106. For example, with additional reference to FIG. 1, the user 106 may have noticed that there is a long line waiting for access to the ARS 102b. With the aid of the ARS 102b (or the server 402, or even one of the other ARSes), the user may be able to determine, using the application 331 (and with the aid of the application 224 in some embodiments), that ARS 102a, ARS 102c, and ARS 102d may be able to process the transaction more quickly than can ARS 102b. Accordingly, the path 712d to the ARS 102d is thicker than that to the ARS 712b, and the paths 712a and 712c to the ARS 102a and ARS 102c, respectively, are thicker yet (although there are many possible design choices, such as indicating a rank (e.g., ARSes 102a and 102c have the shortest line and ARS 102d is shorter than 102b but longer than ARSes 102a and 102c)). Therefore, the user 106 is able to determine that the ARS 102d may be less busy than ARS 102b, and ARSes 102a and 102c may be even less busy than ARS 102d. By following one of the respectively highlighted paths, then, the user 106 is able to proceed to one of the less busy ARSes. In particular, ARS 102a and ARS 102c appear to offer the shortest time to order and transaction, followed by ARS 102d, and finally by ARS 102b, from which the user 106 would like to leave. It should be noted that the software and/or maps depicting the ARSes and paths may be stored on the server 402, one or more of the ARSes 102a-102d, on the user device 302, or at another location reachable by one of these.

In considering other ARS options, the user 106 (using the application 224 or another application), via the user interface 704, may select another ARS, namely ARS 102a (e.g., via path 712a), ARS 102c (e.g., via path 712c), or ARS 102d (e.g., via path 712d) to fulfill the order. Thus, at his option, the user 106 may select the ARS 102a or the ARS 102c to avoid a line but take a longer walk, or the ARS 102d for a shorter line but also a shorter walk.

Offering the alternative ARSes may occur at any stage in processing, including but not limited to before an order is placed, after an order is placed but before confirmation, or after confirmation but before fulfillment. In some embodiments, the connected ARS (ARS 102b in this example) may process stages of the order up until fulfillment if another ARS is selected. Thus, the user 106 may interact with the ARS 102b to place the order and then proceed to the alternate ARS for confirmation and fulfillment, or interact with the ARS 102b to place and transact the order through confirmation and then proceed to the alternate ARS for fulfillment. Either the ARS 102b or the alternate ARS may process the payment in either scenario. Further, the server 402 may perform any of these operations.

In the example of FIG. 7, connected vending machines are presented to illustrate the convenience and efficiency of multi-user support and multi-node coordination in accordance with embodiments described herein. Another example scenario is connected lockers such as a system of smart lockers connected for controlled access by, e.g., employers, employees, online purchasers, delivery companies and personnel, etc. With connected lockers, an employer may provide a controlled space for an employee to leave personal or work items such as a laptop for secure storage and later retrieval in one example. In another example, a fitness center may provide a controlled space for a user to securely store personal items while enjoying exercise facilities. In yet another example, an online purchaser may arrange for pickup of a purchased item from a smart locker. In each of these examples, connected lockers may be reserved, unlocked, and/or locked using a device such as the user device 702. Moreover, using the same concepts described with reference to FIG. 7 and elsewhere herein, alternate lockers can be located in the event that one locker location proves to be crowded (e.g., crowded with fitness center users leaving or retrieving personal items), or a popular locker location where job equipment may be checked out early in the day (e.g., in a workplace setting where employees check out tools or laptops for the day), or one locker location may be less convenient than another to arrange for picking up an item purchased online). In accordance with the concepts described herein, the efficiency of storage and pickup, and the convenience to users, is enhanced by the availability of alternate lockers as ARSes and the ability of users to choose among the same with the assistance of the lockers themselves and/or connected server.

Figure 8:
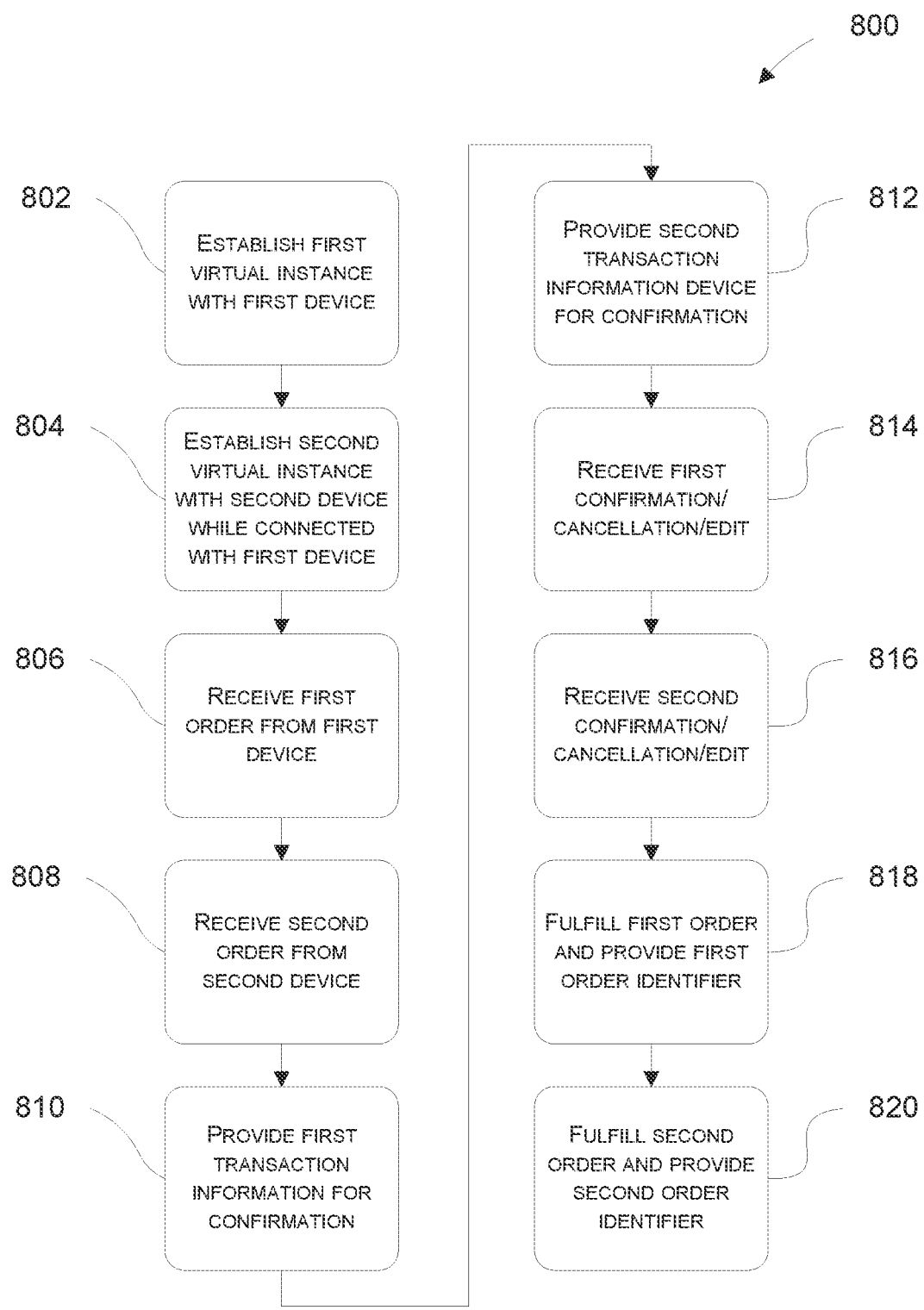
FIG. 8 is a flow diagram of an example process performed at least in part by an ARS for implementing multi-user concurrent transaction processing.
Figure 9:
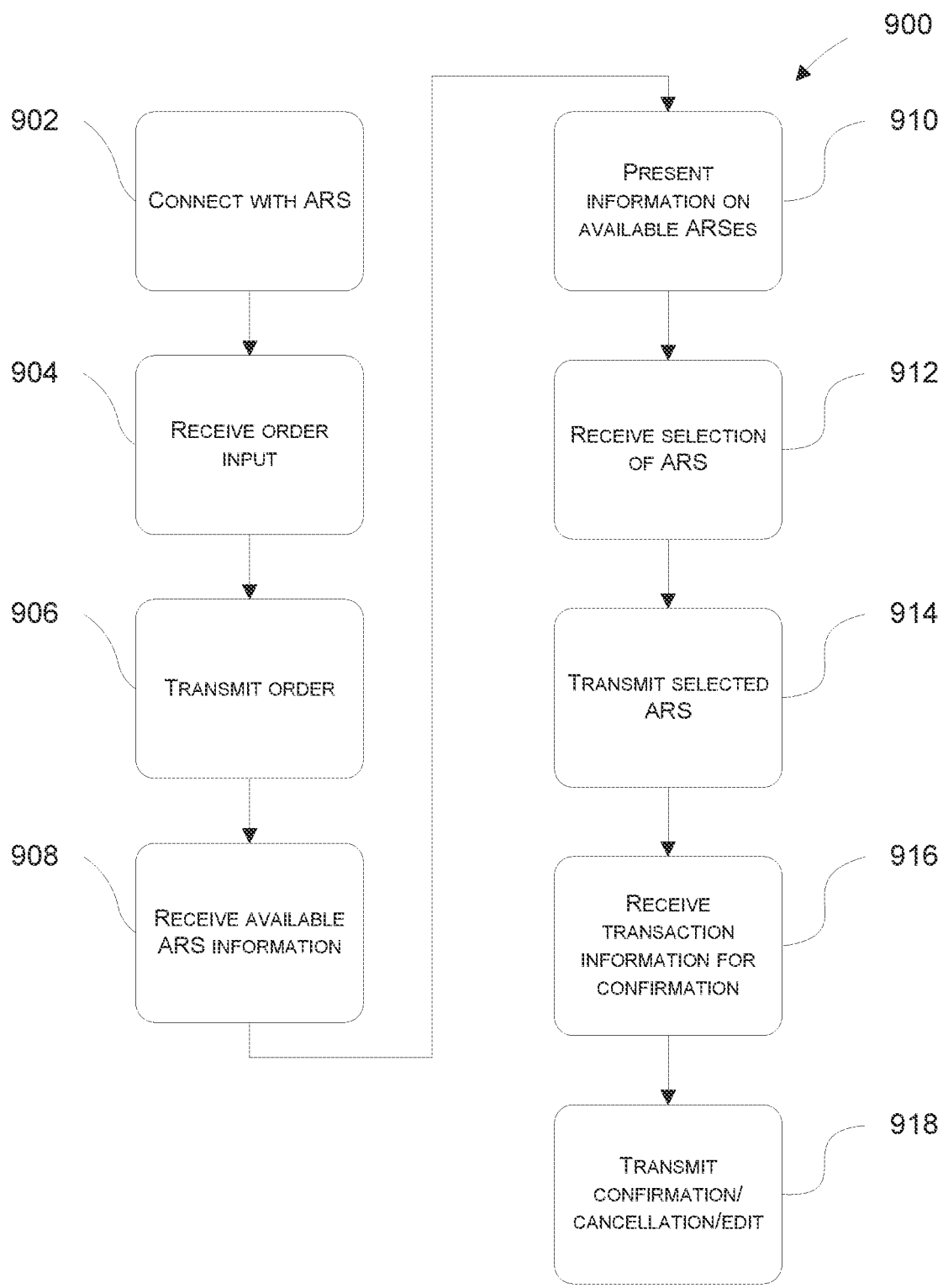
FIG. 9 is a flow diagram of an example process performed at least in part by a user device for implementing ARS coordination processing.
Figure 10:
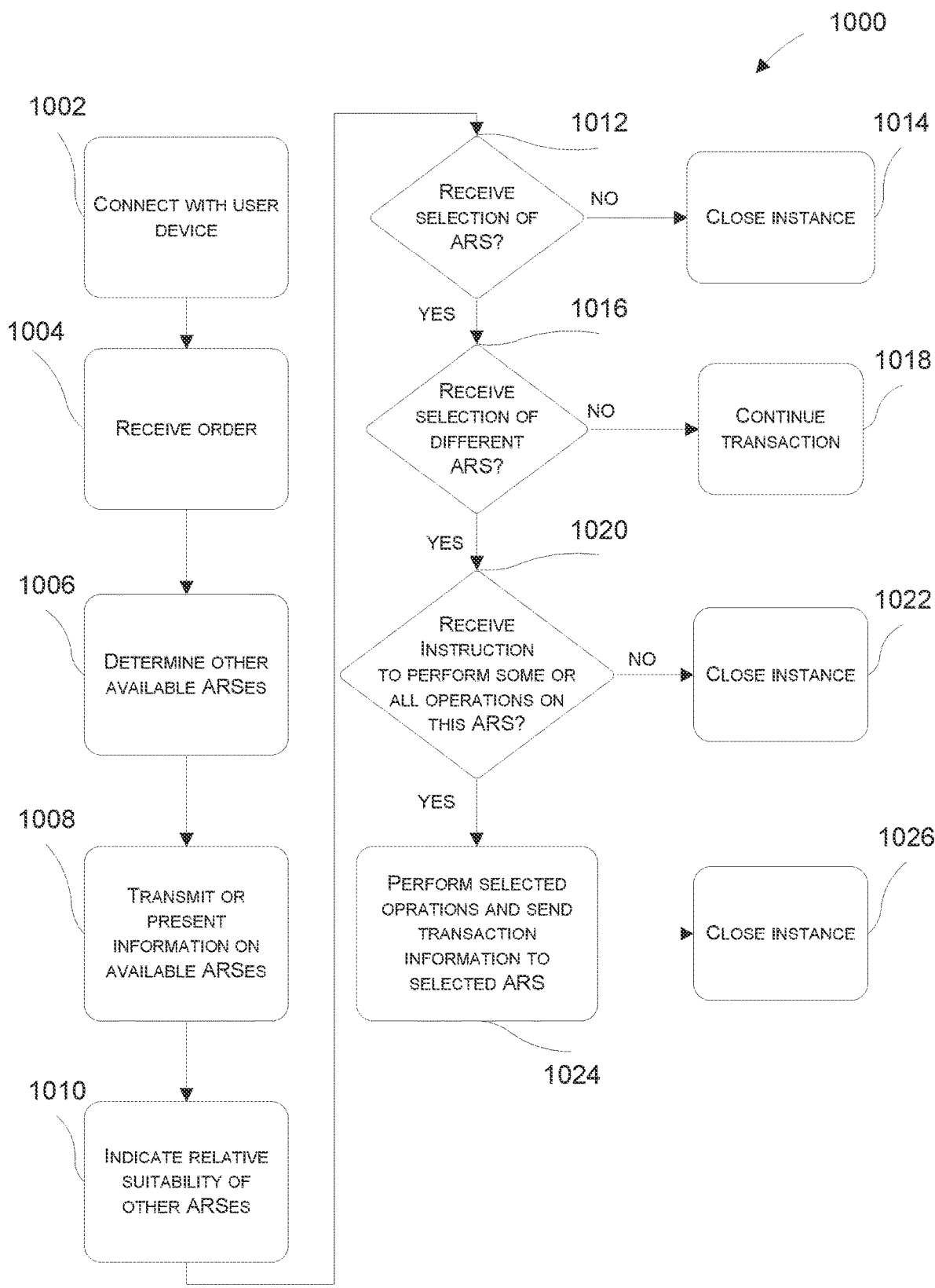
FIG. 10 is a flow diagram of an example process performed at least in part by an ARS for implementing ARS coordination processing.

FIGS. 8-10 present illustrative processes 800-1000, respectively, for implementing multi-user support and multi-node coordination. Each of the processes 800-1000 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800-1000 are described with reference to the architecture 100 of FIG. 1.

FIG. 8 is a flow diagram of an example process 800 performed at least in part by an ARS (e.g., ARS 102b) for implementing multi-user concurrent transaction processing. It should be noted that, although the operations of the example process 800 are described as being performed by an ARS, some or all of the operations described with respect to FIG. 8 may be performed by a server (e.g., the server 402).

At block 802, the ARS may establish a virtual instance with a user device (e.g., user device 104). In some embodiments, this first virtual instance may be performed in response to an order signal (or "order") or connection request received from the user device. In other embodiments, the virtual instance may be performed in response to the user device responding to a signal broadcast by the ARS. In still other embodiments, the user device responding to a signal broadcast by the ARS may establish the virtual connection.

At block 804, the ARS may establish a second virtual instance with a second user device (e.g., user device 116, which is being used by a user 118 standing in line at the ARS 102b). In some embodiments, this second virtual instance may be performed in response to an order or connection request received from the second user device. In other embodiments, the second virtual instance may be performed in response to the second user device responding to a signal broadcast by the ARS. In still other embodiments, the second user device responding to a signal broadcast by the ARS may establish the virtual connection.

At block 806, the ARS may receive a first order from the first user device. The first order may be the order of block 802 combined with an indicator (e.g., name of the item or location in the ARS) of the item ordered, or it may be a separate signal containing the indicator of the item requested, sent after the connection has been established.

At block 808, the ARS may receive a second order from the second user device. The second order may be the order of block 804 combined with an indicator (e.g., name of the item or location in the ARS) of the item ordered, or it may be a separate signal containing the indicator of the item requested, sent after the connection has been established. The ARS may receive the second order before, at the same time, or after the ARS receives the first order, and may process the second order while it is connected to and/or processing the first order.

At block 810, the ARS may provide first transaction information to the first user device. The first transaction information may include, without limitation, an item identifier and/or the price charged for the item requested for the first order.

At block 812, the ARS may provide second transaction information to the second user device. The second transaction information may include, without limitation, an item identifier and/or the price charged for the item requested for the second order. The ARS may provide the second transaction information to the second user before, at the same time, or after the ARS receives the first order from the first user device and/or provides the first transaction information to the first user device. Thus, at least part of both the first order and/or transaction and the second order and/or transaction may be processed at the same time, or in parallel, by the ARS.

At block 814, the ARS may receive a first confirmation from the first user device for confirmation of the first order. The first confirmation may include confirmation that the first transaction information is accepted. In some embodiments, the first user may instead cancel the order or edit the order at this stage.

At block 816, the ARS may receive a second confirmation from the second user device for confirmation of the second order. The second confirmation may include confirmation that the second transaction information is accepted. The ARS may receive the second confirmation from the second user before, at the same time, or after the ARS receives the first order from the first user device and/or provides the first transaction information to the first user device and/or receives the first confirmation from the first user device. Thus, at least part of both the first order and/or transaction and/or confirmation and the second order and/or transaction and/or confirmation may be processed at the same time, or in parallel, by the ARS.

At block 818, the ARS may fulfill the first order for retrieval by the first user. Fulfilling the first order may include releasing the item for pickup at the ARS or enabling a service such as access to a controlled area. In some embodiments, fulfilling the order may include presenting an order indicator, such as a number, to alert the user that the order is ready.

At block 820, the ARS may fulfill the second order for retrieval by the second user. Fulfilling the second order may include releasing the item for pickup at the ARS or enabling a service such as access to a controlled area. In some embodiments, fulfilling the second order may include presenting an order indicator, such as a number, to alert the user that the second order is ready. The ARS may fulfill the second order before, at the same time, or after the ARS receives the first order from the first user device and/or provides the first transaction information to the first user device and/or receives the first confirmation from the first user device and/or fulfills the first order. Thus, at least part of both the first order and/or transaction and/or confirmation and/or fulfillment and the second order and/or transaction and/or confirmation and/or fulfillment may be processed at the same time, or in parallel, by the ARS.

FIG. 9 is a flow diagram of an example process 900 performed at least in part by a user device (e.g., user device 202) for implementing ARS coordination processing.

At block 902, the user device may connect with an ARS (e.g., ARS 102b). The connection may be initiated by a signal (e.g., a connection request or an order) from the user device or by a signal received from the ARS.

At block 904, the user device may receive an order input. In some examples, the order may be input by a user (e.g., user 106) via a user interface (e.g., user interface 204) on the user device. The order input may include an item, quantity, price, and/or the like.

At block 906, the user device may transmit an order to the ARS. The order may be a signal that both requests a connection with the ARS or may be the order only. The order may be placed regardless of whether the ARS is already processing another order.

At block 908, the user device may receive information about other available ARS(es). The information may be provided after the order is placed, at the time the connection is established, or some other time. In some embodiments, the information may be requested by the user via the user interface.

At block 910, the user device may present information on available ARSes for the user to consider. The information may be presented visually via the user interface or audibly via the user interface or otherwise. In some embodiments, the user may select the mode of presentation via the user interface. The information may include identification of one or more ARSes in the vicinity of the user device, one or more paths to the ARSes, an indication of preferred ARSes, and/or a ranking of best-suited ARSes. The information may be presented at any time between connection and fulfillment.

At block 912, the user device may receive a selection of one of the presented ARSes. The selection may be made by the user via the user interface.

At block 914, the user device may transmit the selected ARS to the connected ARS. Transmission may be effected by the user via the user interface.

At block 916, the user device may receive transaction information for confirmation. The transaction information may be received from either the connected ARS or from an alternate ARS if selected, in which case a connection needs to be established with the alternate ARS. The connection may be established automatically in response to the user transmitting the selected ARS at block 914.

At block 918, the user device may transmit a confirmation, cancellation, or edition of the transaction information.

In the event that the transaction information is edited, the user device may wait for new transaction information. In the event of a confirmation, the user may proceed to the alternate ARS. If a cancellation, then the process ends and either the user device or the ARS may close the connection.

FIG. 10 is a flow diagram of an example process 1000 performed at least in part by an ARS (e.g., ARS 102b) for implementing ARS coordination processing. It should be noted that, although the operations of the example process 1000 are described as being performed by an ARS, some or all of the operations described with respect to FIG. 10 may be performed by a server (e.g., the server 402).

At block 1002, the ARS may connect with the user device. The connection may be initiated by the ARS broadcasting a signal or responding to an order or other communication from the user device.

At block 1004, the ARS may receive an order for a product or service.

At block 1006, the ARS may determine whether there are other available ARSes to handle the order received at block 1004. For example, the ARS may determine that it cannot transact the order for some reason such as lack of the item ordered. In some embodiments, the ARS may determine by itself that another ARS may have a shorter line of people waiting to order or have an order fulfilled. This determination may be made by a sensor on the ARS or by the frequency or number of orders, for example. The ARS may determine that another ARS would be better suited (i.e., have the missing item in stock or have a shorter wait) by communicating directly with other ARSes or with a server (e.g., server 402) that monitors the ARSes.

At block 1008, the ARS may transmit information on available ARSes to the user device or present such information on the ARS. The information may be configured for presenting as a map or audibly on either the user device or on the ARS itself.

At block 1010, the ARS may indicate the suitability of other ARSes relative to itself or to another reference. In some embodiments, the indication may be on the map showing other ARSes and/or paths to them. For example, the map may show suitability by highlighting preferable ARSes and/or the paths to them. In some embodiments, the ARSes may be ranked.

At decision block 1012, the ARS may determine whether it has received a selection of an ARS. The selection may come from a user device, for example. If no selection has been received (i.e., "No" at block 1012), then the process 1000 may proceed to block 1014, at which the connection is closed. If a selection has been received (i.e., "Yes" at block 1012), then the process 1000 may proceed to decision block 1016.

At decision block 1016, the ARS may determine whether a different ARS has been selected. If a different ARS has not been selected (i.e., "No" at block 1016), then the process 1000 may proceed to block 1018. At block 1018, the transaction may proceed by the ARS by sending a transaction confirmation communication to the user device and completing, cancelling, or editing the transaction, followed by fulfillment, as described elsewhere herein. If a selection has been received (i.e., "Yes" at block 1016), then the process 1000 may proceed to block 1020.

At decision block 1020, the ARS may determine whether it has received an instruction to perform any or all of the ensuing transaction operations. If an instruction has not been received within a preset time period such as five seconds (i.e., "No" at block 1020), then the process 1000 may proceed to block 1022, at which the connection is closed. In some embodiments, depending on the stage of the transaction at which the ARS determines that no instruction has been received, the ARS, before closing the connection, may send the order information, including any confirmation or indication of a payment received, to the selected ARS. If an instruction has been received (i.e., "Yes" at block 1020), then the process 1000 may proceed to block 1024.

At block 1024, the ARS may send any transaction information resulting from its performance to the selected ARS, up to but not including fulfillment. Any remaining operations to be performed may be performed by the selected ARS, including fulfillment as described elsewhere herein.

At block 1026, the ARS may close the connection.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An apparatus comprising:
one or more processors; and
memory operatively coupled to the one or more processors, the memory storing computer-executable instructions that, if executed by the one or more processors, cause the one or more processors to perform operations comprising:
opening, via a communication interface, a first communications connection with a user device;
receiving, over the first communications connection and via a first interface, a request from the user device to find another apparatus that has a desired product;
in response to receiving the request, determining whether there are other apparatuses to fulfill an order for the desired product;
determining a suitability of the other apparatuses to perform one or more operations to fulfill the order relative to the apparatus, the suitability including a rank of an estimated time-to-fulfillment relative to the estimated time-to-fulfillment of the other apparatuses;
transmitting, to the user device over the first communications connection, information about the other apparatuses, the information including the determined suitability;
receiving the order, from the user device and via the first interface, for the desired product, wherein the first user interface displays a button that toggles between the first interface and a second interface;
receiving, from the user device and via the first interface, a selection of the button and, in response to receiving the selection of the button, presenting the second interface, wherein the second interface presents a map showing the other apparatuses, paths to the other apparatuses and the relative ranks of estimated time-to-fulfillment relative to the estimated time-to-fulfillment of the other apparatuses indicated by highlighting a path of the paths;
receiving, over the first communications connection and from the user device, a selection of one of the other apparatuses to fulfill the order;
in response to receiving the order and the selection, opening automatically, via the communication interface, a second communications connection with the selected apparatus over which to transmit data to and receive data from the selected apparatus;

determining whether the apparatus is to perform at least one operation to process a transaction for the order that is to be fulfilled by the selected apparatus;

in response to determining that the apparatus is to perform the at least one operation to process the transaction, performing the at least one operation and transmitting information of associated with the performance of the at least one operation over the second communications connection to the selected apparatus;

in response to determining that the apparatus is to perform no operation to perform the transaction, informing the selected apparatus over the second communications connection to process the transaction and fulfill the order; and closing the first communications connection.

2. The apparatus of claim 1, wherein: determining the suitability includes determining that the apparatus cannot supply the desired product.

3. The apparatus of claim 1, wherein:

determining the suitability includes determining that the selected apparatus has fewer users waiting to place orders than the apparatus.

4. The apparatus of claim 3, further comprising:

one or more sensors configured to determine a number of users waiting to place orders at the apparatus.

5. The apparatus of claim 4, wherein:

determining the suitability includes receiving over the second communications connection and from the selected apparatus, a communication that fewer users are waiting to place orders than the number of users waiting to place orders at the apparatus.

6. One or more non-transitory computer-readable media storing computer-executable instructions that, if executed by one or more processors, cause the one or more processors to perform operations comprising:

opening, via a communication interface, a first communications connection with a user device;

receiving, over the first communications connection and via a first interface, a request from the user device to find another apparatus that has a desired product;

in response to receiving the request, determining whether there are other apparatuses to fulfill an order for the desired product;

determining a suitability of the other apparatuses to perform one or more operations to fulfill the order relative to an apparatus, the suitability including a rank of an estimated time-to-fulfillment relative to the estimated time-to-fulfillment of the other apparatuses;

transmitting, to the user device over the first communications connection, information about the other apparatuses, the information including the determined suitability;

receiving the order, from the user device and via the first interface, for the desired product, wherein the first user interface displays a button that toggles between the first interface and a second interface;

receiving, from the user device and via the first interface, a selection of the button and, in response to receiving the selection of the button, presenting the second interface, wherein the second interface presents a map showing the other apparatuses, paths to the other apparatuses and the relative ranks of estimated time-to-fulfillment relative to the estimated time-to-fulfillment of the other apparatuses indicated by highlighting a path of the paths;

receiving, over the first communications connection and from the user device, a selection of one of the other apparatuses to fulfill the order;

in response to receiving the order and the selection, opening automatically, via the communication interface, a second communications connection with the selected apparatus over which to transmit data to and receive data from the selected apparatus;

determining whether the apparatus is to perform at least one operation to process a transaction for the order that is to be fulfilled by the selected apparatus;

in response to determining that the apparatus is to perform the at least one operation to process the transaction, performing the at least one operation and transmitting information associated with the performance of the at least one operation over the second communications connection to the selected apparatus;

in response to determining that the apparatus is to perform no operation to perform the transaction, informing the selected apparatus over the second communications connection to process the transaction and fulfill the order; and closing the first communications connection.

7. The one or more non-transitory computer-readable media of claim 6, wherein:

determining the suitability includes determining that the apparatus cannot supply the item ordered.

8. The one or more non-transitory computer-readable media of claim 6, wherein the operations further comprise:

determining a number of users waiting to place orders at the apparatus;

wherein determining the suitability includes determining that the selected apparatus has fewer users waiting to place orders than the apparatus.

9. The one or more non-transitory computer-readable media of claim 8, wherein:

determining the suitability includes receiving a communication from the selected apparatus that fewer users are waiting to place orders thanthe number of users waiting to place orders at the apparatus.

10. A system having networked apparatuses configured to individually and collectively vend products and services via direct communication with each other and via communication with each other over a network, each of the networked apparatuses comprising:

one or more processors; and memory operatively coupled to the one or more processors, the memory storing computer-executable instructions that, if executed by the one or more processors, cause the one or more processors to perform operations comprising:

opening, via a communication interface, a first communications connection with a user device;

receiving, over the first communications connection and via a first interface, a request from the user device to find another apparatus that has a desired product;

in response to receiving the request, determining whether there are other apparatuses of the networked apparatuses to fulfill an order for the desired product;

determining a suitability of the other apparatuses to perform one or more operations to fulfill the order relative to an apparatus of the networked apparatuses, the suitability including a rank of an estimated time-to-fulfillment relative to the estimated time-to-fulfillment of the other apparatuses;

transmitting, to the user device over the first communications connection, information about the other apparatuses, the information including the determined suitability;
receiving the order, directly from the user device and via the first interface, over the first communications connection or indirectly via a selected apparatus of the networked apparatuses for the desired product, wherein the first user interface displays a button that toggles between the first interface and a second interface;
receiving, from the user device and via the first interface, a selection of the button and, in response to receiving the selection of the button, presenting the second interface, wherein the second interface presents a map showing the other apparatuses, paths to the other apparatuses and the relative ranks of estimated time-to-fulfillment relative to the estimated time-to-fulfillment of the other apparatuses indicated by highlighting a path of the paths;
fulfilling the order in response to receiving the order directly;
in response to receiving the order indirectly:
  receiving, over the first communications connection and from the user device, a selection of one of the other apparatuses to fulfill the order;
  in response to receiving the order and the selection, opening automatically, via the communication interface, a second communications connection with the selected apparatus over which to transmit data to and receive data from the selected apparatus over the network;
  determining whether the apparatus is to perform at least one operation to process a transaction for the order that is to be fulfilled by the selected apparatus;
  in response to determining that the apparatus is to perform the at least one operation to process the transaction, performing the at least one operation and transmitting information associated with the performance of the at least one operation over the second communications connection to the selected apparatus;
  in response to determining that the apparatus is to perform no operation to perform the transaction, informing the selected apparatus over the second communications connection to process the transaction and fulfill the order; and
  closing the first communications connection.

11. The system of claim 10, wherein:
determining the suitability includes determining whether the other apparatuses can supply the desired product and whether the selected apparatus has fewer users waiting to place orders than the other apparatuses.

\* \* \* \* \*